United States Patent [19]
Mallison et al.

[11] Patent Number: 5,157,844
[45] Date of Patent: Oct. 27, 1992

[54] PRECISION BLIND MARKING AND POSITIONING SYSTEM FOR LOCATING CUTOUTS IN WALL OPENINGS

[76] Inventors: Edgar R. Mallison, 15808 Post Rd., Wayzata, Minn. 55391; Don A. Orton, 7900 Lower 139th Ct., Apple Valley, Minn. 55124

[21] Appl. No.: 880,886

[22] Filed: May 8, 1992

Related U.S. Application Data

[63] Continuation-in-part of Ser. No. 597,416, Oct. 15, 1990.

[51] Int. Cl.$^5$ .................................................. G01B 3/00
[52] U.S. Cl. ........................... 33/528; 33/DIG. 10; 33/613; 33/645
[58] Field of Search .............. 33/DIG. 10, 528, 526, 33/527, 613, 645; 52/546, 547, 416, 715

[56] References Cited

U.S. PATENT DOCUMENTS

| | | | |
|---|---|---|---|
| 2,319,129 | 5/1943 | Hamilton | 52/509 |
| 2,775,812 | 1/1957 | Mohr | 33/DIG. 10 |
| 3,888,013 | 6/1975 | Benoit | 33/DIG. 10 |
| 3,940,857 | 3/1976 | Giordano | 33/DIG. 10 |
| 3,943,631 | 3/1976 | Smugor | 33/DIG. 10 |
| 4,161,821 | 7/1979 | Miller | 33/41.1 |
| 4,227,307 | 10/1980 | Tassoni | 33/42 X |

Primary Examiner—Harry N. Haroian
Attorney, Agent, or Firm—Haugen and Nikolai

[57] ABSTRACT

A system for positioning and blind marking construction material panels includes clips designed to support marking projections relative to installed construction components such as electrical outlet boxes and frames for windows and doors. A leg flexure of each clip is used to secure the clip to thin walled components. Each of the clips further has alignment projections that abut the component edges, for securely positioning the clips. The flexure legs break away to enable use of the clip on thick walled components, with an adhesive retaining the clip in lieu of the leg flexure. The system further includes stabilizers for aligning an unsecured panel in parallel spaced apart relation to a previously installed panel, thus to edge-align the panels for precise placement of markings on an inside surface of the panel to be installed.

20 Claims, 2 Drawing Sheets

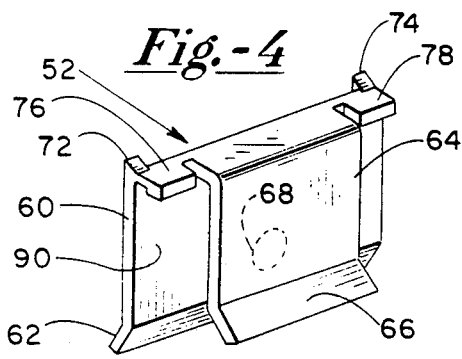
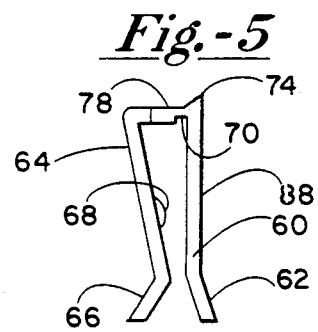
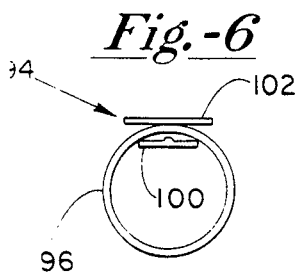
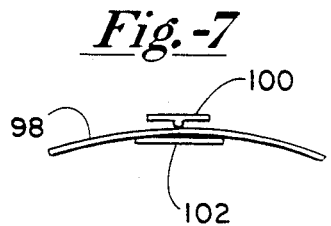
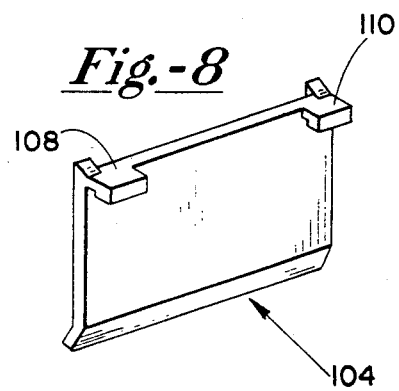
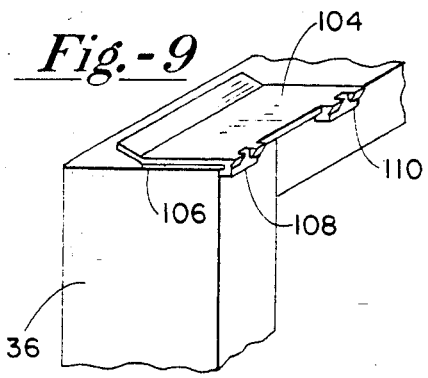
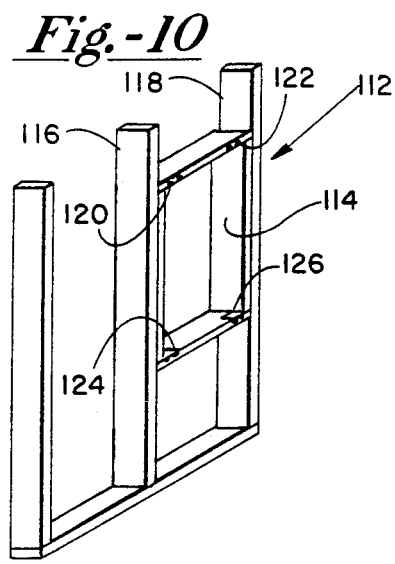
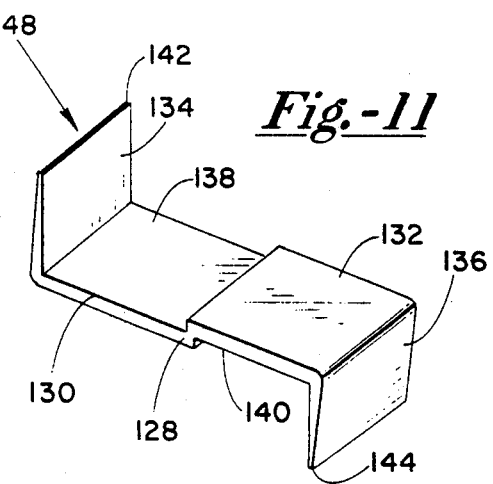

PRECISION BLIND MARKING AND POSITIONING SYSTEM FOR LOCATING CUTOUTS IN WALL OPENINGS

CROSS-REFERENCE TO RELATED

This is a continuation-in-part of our copending application Ser. No. 07/597,416, filed Oct. 15, 1990, entitled "DEVICE FOR LAYOUT OF CONSTRUCTION OPENINGS".

BACKGROUND OF THE INVENTION

This invention relates generally to the construction of walls, ceilings and floors, and more particularly to apparatus for aligning an unsecured panel of construction material in a parallel and offset relation to a previously installed panel, to facilitate precise location of material to be removed from the unsecured panel in providing clearance for previously installed construction components. This invention also concerns means for marking cutout locations on the unsecured panel while it is so aligned.

A common problem in commercial and residential construction and remodeling, is the need to precisely identify the location, shape and size of openings to be cut in a construction material panel, to provide for access to previously installed construction components after the panel is installed. Typically, such panels are formed of sheetrock, plywood, drywall, particle board or sheet metal. Construction components include items such as electrical outlet boxes, inlets and outlets of heating and ventilation ducts, window frames and door frames (or rough-ins for such frames), recessed lighting, and plumbing pipe. Where such construction components are present, cutouts must be provided in the panel before it is permanently secured to wall support structure such as studs or joists. The cutouts permit the construction components to at least partially protrude through the wall, floor or ceiling, providing access to the components after the panel is in place.

To make the cutouts, common practice includes measuring vertical and horizontal distances from a predefined location to each component for which a cutout is required. Based on these measurements, a layout or pattern of needed cutouts is formed on the panel to be installed. The measurements are made along the preexisting wall support structure, then transferred by hand to the panel, where the appropriate geometric figures are drawn at the identified locations.

This measurement and transfer process is time consuming, and subject to considerable error. Consequently, cutouts frequently are the wrong size, in the wrong location, or both. In any event, the result is wasted time, wasted materials, or the need for patching or other repair.

U.S. Pat. No. 3,940,857 (Giordano) discloses a marking method for locating cutouts or recesses for outlet boxes. While satisfactory in connection with metal outlet boxes prevalent in the past, the clips shown in Giordano are not well suited for plastic electrical outlet boxes. In particular, the right-angular clip taught in this patent would encounter interference from preset guidance pegs molded into the plastic boxes, and further would encounter interference from a stud to which the box is attached.

An adaptor for indicating cutout locations in wall panels is shown in U.S. Pat. No. 3,943,631 (Smugor). Like the Giordano clips, the adapters shown in Smugor are particularly suited for metal electrical outlet boxes.

A further example of a marker is disclosed in U.S. Pat. No. 2,775,812 (Mohr). This patent teaches blades formed at one edge portion of an outlet box, to a frame corresponding generally in size to an outlet box, or to a template. A somewhat similar approach, comprised of multiple marking teeth, is shown in U.S. Pat. No. 2,898,688 (Cottar).

The art discloses certain schemes for supporting wall panels, e.g. U.S. Pat. Nos. 2,317,428 (Anderson), 2,319,129 (Hamilton) and 2,261,481 (Morrell). However, these patents address the permanent support of wall panels, rather than the temporary support of panels for marking cutout locations.

Therefore, it is an object of the present invention to provide an apparatus for temporarily yet positively supporting an unsecured panel of construction material in a parallel and offset relation to a previously installed panel, to facilitate convenient and accurate location of cutouts for construction components.

Another object is to provide a means for indicating the location of material to be removed from unsecured panels of construction material, prior to their installation, to provide clearance for previously installed construction components.

A further object is to provide a system for aligning a panel of construction material in parallel and offset relation to a previously installed panel and for marking the location of cutouts to be formed through the panel.

Yet another object is to provide an approach to marking uninstalled panels for cutouts, that substantially reduces the time required to properly position the panel and identify cutout locations, without requiring a high level of skill on the part of the user.

SUMMARY OF THE INVENTION

To achieve these and other objects, there is provided an apparatus for aligning a panel of construction material in a parallel and offset relation to a previously installed panel of the construction material. The apparatus includes a unitary and substantially rigid alignment member including a medial segment, and a first edge alignment segment extending away from the medial segment. The first edge alignment segment has a planar first edge alignment surface disposed in an alignment plane. A second edge alignment segment extends from an opposite side of the medial segment, and has a second planar edge alignment surface in the alignment plane and spaced apart from the first alignment surface a selected distance determined by a thickness of the medial segment. The first and second alignment surfaces face in opposite directions.

The first edge alignment surface is adapted for contiguous surface engagement with a first end edge surface of the installed panel of construction material. The second edge alignment surface is adapted for contiguous surface engagement with a second end edge surface of an unsecured panel of construction material, with the installed and unsecured panels also being contiguous with the medial segment. This positions the unsecured panel parallel to the installed panel, spaced apart from the installed panel by the selected distance, and aligns the first and second end edge surfaces with one another in the alignment plane.

Thus, it is possible to align the respective end edge surfaces of the installed and unsecured panels offset from one another yet precisely aligned as to these edges.

Accordingly, when a construction component prevents positioning the unsecured panel flush against the wall, there is no need to edge-align panels with the unsecured panel at an undesirable offset angle from its desired parallelism to the installed panel, and no need to attempt to align the panels by sight as the unsecured panel is held by hand, in what is hoped to be a parallel, spaced part relation. Either of these conventional approaches can lead to errors in marking positions for cutouts, errors which are substantially eliminated using the rigid alignment members of the present invention.

In one particularly advantageous construction, the alignment member further includes first and second end segments extended away from respective portions of the first and second edge alignment segments remote from the medial segments. The end segments, edge alignment segments and medial segment cooperate to define grooves for receiving portions of the installed panel and the unsecured panel, respectively, thus to more positively maintain the unsecured panel properly aligned for marking.

More preferably, the first and second end segments are tapered to converge in the direction that they extend away from their respective edge alignment segments. This facilitates insertion of the first end segment beneath the installed panel, i.e. between the installed panel and the stud or other frame member supporting the panel.

Another aspect of the present invention is an apparatus for indicating the location of material to be removed from an unsecured panel of construction material, prior to installing the panel, to provide clearance for previously installed construction components. The apparatus includes a carrier body, and a pair of alignment projections that extend from one edge of the carrier body. The alignment projections extend in a direction perpendicular to a major plane of the carrier body, and are disposed to engage an outer end edge of an installed construction component, while the carrier body is contiguous with a component surface of the construction component. The apparatus further includes at least one marking projection extending from the one edge of the carrier body in the direction of the major plane, outwardly of the construction component when the body is contiguous with the component surface and when the alignment projections abut the component edge. This positions the marking projection to engage a surface of an unsecured panel of the construction material being moved inwardly toward the construction component. The marking projection forms a position mark upon the panel as the panel is moved further inward beyond the engagement.

Preferably the apparatus further includes a flexible leg supported at one of its ends by the carrier body. The leg is spaced apart from the body and cooperates with the carrier body to elastically secure a portion of the construction component between the body and the leg. Further, the leg can be substantially narrower than the carrier body, and substantially centered relative to the carrier body between the pair of alignment projections. This facilitates using the apparatus on curved construction components, e.g. pipes or round ducts.

A further desirable feature of the leg and carrier body construction is a relief groove that runs along the interface between the leg and the body. The relief groove can accommodate thin sheet metal, e.g. in certain duct work. Further, the relief groove facilitates flexing of the leg, and also permits a breaking of the leg away from the body upon sufficient flexing of the leg. The result of this breakage is that the apparatus can be used on door frames and window frames, which otherwise would be too wide to accommodate the leg flexure. Of course, two-sided tape or other suitable adhesive should be used to secure the apparatus in conjunction with the alignment projections.

Yet another feature of the invention is a system in which panels are aligned with one another using the rigid alignment members, while electrical outlet boxes, pipes, duct work and other construction components are provided with the marking or location indicating apparatus, in the form of several clips attached to each construction component. Preferably the system involves several rigid alignment members, all along and contiguous with the same edge of the installed panel.

In accordance with the present invention, cutouts for all sorts of previously installed construction components are precisely aligned, quickly and conveniently, without requiring an undue amount of skill or experience on the part of the user. Thus, the system of rigid alignment members and clips is suitable for the professional seeking the precision alignment of cutouts in panels before they are installed, while the occasional user is assured more accurate results and greater ease of measurement.

IN THE DRAWINGS

For a further understanding of the above and other features and advantages, reference is made to the following detailed description and to the drawings, in which:

FIG. 4 is a perspective view of one of the clips illustrated in FIG. 1;

FIG. 5 is an end view of the clip;

Figure 1:
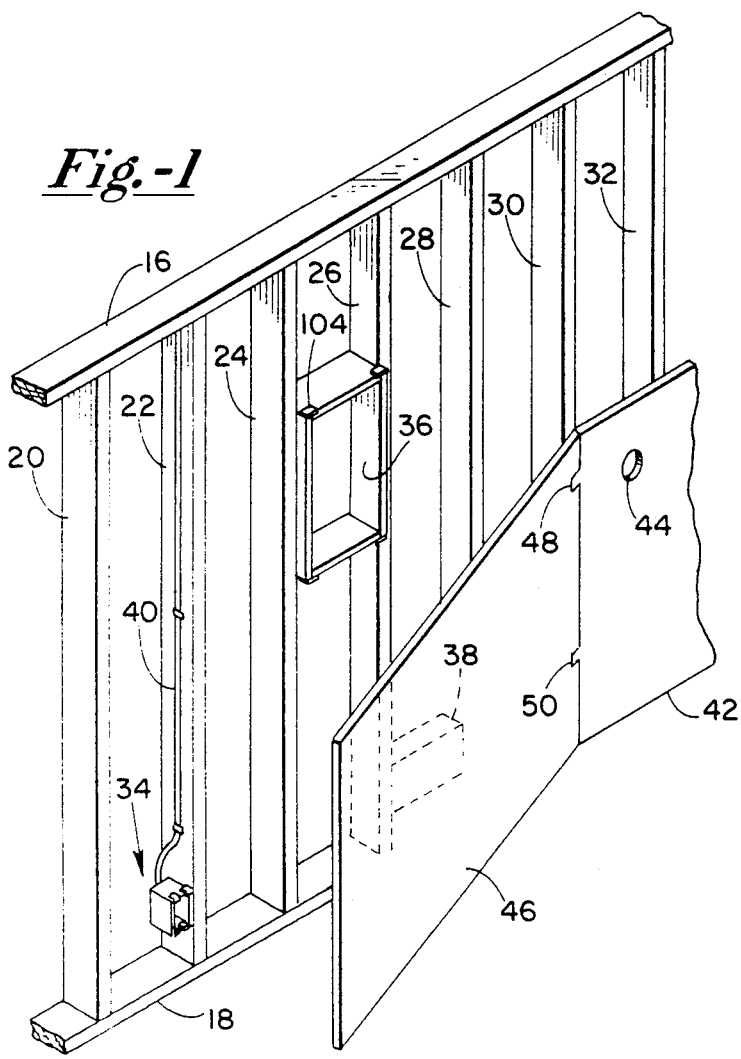
FIG. 1 is a perspective view of a stud wall structure and construction components affixed to the wall structure, illustrating the use of stabilizers and clips constructed in accordance with the present invention.

FIGS. 6 and 7 schematically illustrate the clips mounted to pipe and a heating duct, respectively;

FIG. 8 is a perspective view of another one of the clips with a leg of the clip broken away in accordance with one aspect of the present invention;

FIG. 9 is an enlarged perspective view illustrating a portion of FIG. 1;

FIG. 10 illustrates an alternative positioning of the clips on a window frame; and FIG. 11 is a perspective view of one of the stabilizers shown in FIG. 1.

DETAILED DESCRIPTION OF THE PREFERRED EMBODIMENTS

Turning now to the drawings, there is shown in FIG. 1 a stud wall structure including an upper horizontal member 16, a bottom horizontal member 18 and several vertical, spaced apart studs 20-32 supported in spaced apart relation between members 16 and 18. Certain construction components affixed to the wall structure include an electrical outlet box 34 mounted to stud 22, a rough-in window frame 36 supported between studs 24 and 26, and another electrical outlet box 38 (shown in phantom) mounted to stud 26. Electrical conduit 40, extending upwardly from outlet box 34, also is secured to stud 22.

A construction material panel 42 is secured to the stud wall structure, e.g. by nailing to studs 30 and 32. A pipe cutout 44 is formed through panel 42. Another panel 46 of the construction material is shown not yet secured to the wall structure. Cutouts, similar to pipe cutout 44, must be formed in panel 46 before it ca be nailed to the studs. More particularly, a rectangular cutout is necessary along the top of the panel to accommodate the bottom portion of frame 36, and a further rectangular cutout is necessary to accommodate heat duct 38.

Figure 2:
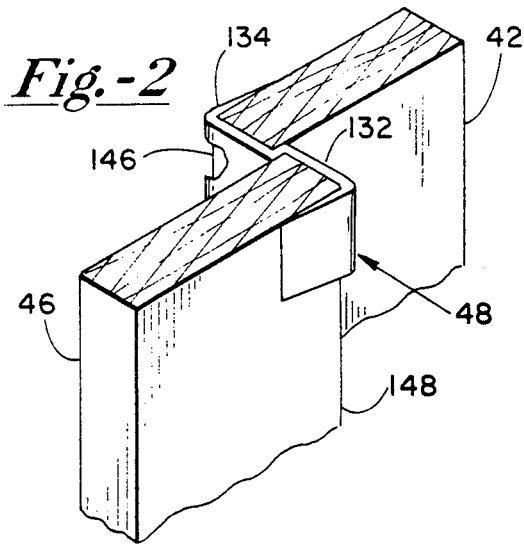
FIG. 2 is an enlarged perspective view, partially in section, of a portion of FIG. 1.

A pair of stabilizers 48 and 50 are positioned between the confronting edges of panels 42 and 46. As seen in FIG. 2, stabilizer 48 is formed to provide a pair of oppositely facing channels, one of which accommodates panel 42 while the other accommodates panel 46. As a result, unsecured panel 46 is held in parallel and spaced apart relation to previously installed panel 42, with the respective confronting edges aligned with one another. In other words, the respective confronting panel edges lie in the same plane, i.e. a vertical plane perpendicular to the major dimension (length) of the installed panel. Stabilizer 50 is substantially identical to stabilizer 48, and provides the same type of support. It is to be appreciated that any suitable number of the stabilizers can be employed, depending primarily upon the size and weight of the panels.

Figure 3:
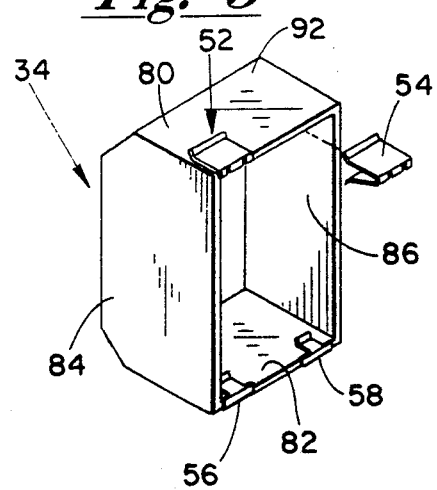
FIG. 3 is an enlarged perspective view of one of the construction components illustrated in FIG. 1.

FIG. 3 illustrates four marker carriers or clips 52, 54, 56 and 58 mounted to electrical outlet box 34. Considering FIGS. 4 and 5 along with FIG. 3, it is apparent that clip 52 (for example) includes a substantially flat and planar base or carrier body 60, and a foot 62 extended from the based at an inclined angle relative to the base. A flexible leg 64, narrower than the base, is mounted to the base near the top of the clip (as shown in FIGS. 4 and 5). A foot 66 at the bottom of leg 64 is angularly offset from the leg, and confronts foot 62. A camming dimple 68 is formed on the surface of the leg that faces base 60.

A stress relief groove is formed along the entire length of base 60, at the area of contact with base 60. The stress relief groove 70 facilitates a flexing of the leg away from base 60, clockwise as viewed in FIG. 5. Groove 70 also can accommodate the edge of a sheet metal duct. The stress relief groove also enables a breaking away of leg 64 to effect its complete separation from base 60 upon sufficient flexure of the leg, for reasons to be explained.

Several projections are formed integrally with base 60 near its top, including a pair of marking projections 72 and 74, and a pair of alignment projections 76 and 78. The marking projections have pointed edges. These pointed edges are preferred for penetrating the panel at the inside surface, although a non-penetrating marking means, e.g. ink applied to the marking projection tips, could be employed.

Returning to FIG. 3, electrical outlet box 34 includes a plurality of walls including a top wall 80, bottom wall 82 and opposite side walls 84 and 86. As illustrated, clips 52-58 are mounted to the top wall and bottom wall, both of which have a thickness slightly greater than the distance between leg 64 and base 60 at their closest proximity. Thus, some flexing of leg 64 is necessary to accommodate the wall. Feet 62 and 66 cooperate to provide a lead-in or capture region to facilitate mounting of the clip. When the clip (e.g. 52) is installed, the flexed leg provides a residual force that tends to frictionally secure the clip onto wall 80. Clip 52 is mounted completely onto the outlet box, in the sense that it is pushed inwardly until alignment projections 76 and 78 abut the edge of wall 80. Accordingly, the alignment projections cooperate with the residual force in leg 64 to positively secure the clip against any linear movement or rotation relative to the outlet box. This insures that the clip is not disturbed when an aligned but unsecured panel (such as panel 46) is pressed against marking projections 72 and 74. As seen in the Figures, each of these marking projections is tapered to a point which is aligned with an outside surface 88 of base 60. The inside surface 90 of the base is flush against a top surface 92 of wall 80, for accurate alignment of the marking projections relative to the outlet box. Camming dimple 68 facilitates application of the flexed leg residual force over a permitted range of wall thicknesses.

The remaining clips are substantially identical in construction to clip 52.

FIGS. 6 and 7 schematically illustrate the manner in which a clip 94 can be mounted to non-rectangular construction components, e.g. a pipe 96 and a round heating duct 98. For the relatively smaller diameter pipe, a leg 100 is positioned radially inwardly, with a base 102 on the outside of the pipe. By contrast, for the larger diameter duct 98, base 102 is positioned on the inside.

Frames for windows and doors have thicknesses such that retaining the clips by flexed leg residual force is not practical. Therefore, groove 70, which aids flexure and also is sized for accommodating the edge of a rectangular duct, also allows a complete breaking away of the leg, whereupon a clip 104 (originally like clip 52) takes the form shown in FIG. 8. FIG. 9 illustrates the attachment of clip 104 to window frame 36, following removal of the leg. An adhesive, e.g. a strip of double sided tape 106, is applied to the inside surface of a base of clip 104, and secures the base relative to the frame. The adhesive need not be of sufficient strength to provide the sole support for clip 104 as an unsecured panel is pressed against the marking projections. This is because alignment projections 108 and 110 abut window frame 36 to provide virtually all of the force counter to the force of a panel pressed against the marking projections, with the adhesive merely insuring that clip 104 remains in place.

FIG. 10 illustrates a wall support structure 112 including a rough-in window frame 114 supported between a pair of studs 116 and 118. Four clips 120, 122, 124 and 126, each with its leg broken away, are supported to the inside of frame 114, showing an alternative approach to mounting the clips. Due to the adhesive, the clips need not rest upon the frame as illustrated in FIG. 9.

Stabilizer 48 is shown in detail, in FIG. 11. The stabilizer is unitary and substantially rigid, and can be constructed of durable plastics, steel, or other suitable material. In general, the stabilizer has a medial segment 128, two edge alignment sections 130 and 132 extending in opposite directions away from the medial segment, and a pair of end segments 134 and 136.

Edge alignment segment 130 has a planar edge alignment surface 138. Edge alignment segment 132 likewise has an edge alignment surface 140. Surfaces 138 and 140 are coplanar, i.e. both are contained in an alignment plane. The alignment surfaces further are spaced apart from one another a selected distance equal to the thickness of medial segment 128. Each of the end segments extends away from its associated edge alignment segment in a direction perpendicular to the alignment plane, converging to a narrow edged as indicated at 142 and 144, respectively. Thus, medial segment 128, edge alignment segment 130 and end segment 134 cooperate to provide a groove for receiving a portion of installed sheet panel 42. An end edge surface 146 of panel 42 abuts alignment surface 138.

Similarly, the medial segment, edge alignment segment 132 and end segment 136 cooperate to provide a groove for uninstalled panel 46, whereby the panel fits into the groove with an end edge surface 148 of the panel contiguous with alignment surface 140 of the stabilizer.

End segments 134 and 136 afford symmetry to stabilizer 48, and a further advantage of positive support of the unsecured panel. More particularly, end segment 134 is wedged firmly into place between installed panel 42 and stud 30, while end segment 136 extends along the edge portion of panel 46 to provide the necessary holding force. This feature is particularly advantageous in connection with ceiling panels, where the stabilizers counteract gravity in maintaining an unsecured panel in place, while an operator supports the unsecured panel at its opposite edge.

When panels 42 and 46 occupy the respective grooves of stabilizer 48, and any other stabilizers placed along confronting edges 146 and 148, unsecured panel 46 is positioned parallel to installed panel 42, and spaced apart from the installed panel by a distance equal to the medial segment thickness. Further, end edge surfaces 146 and 148 are substantially aligned with one another in the alignment plane. In other words, unsecured panel 46 is securely and precisely positioned for blind marking of various cutouts to accommodate the construction components.

Marking for cutouts is easily accomplished, by pressing the unsecured panel, when it is properly aligned, inwardly toward the studs. It sometimes is beneficial to tap or lightly pound upon panel 46 in the vicinity of the clips, to insure that the various marking projections penetrate the inside surface of panel 46 sufficiently to leave marks upon the panel.

Thus, convenient yet accurate marking is achieved, due to the secure, parallel alignment of the unsecured panel. There is no guesswork involved in aligning the panel. Nor is there any need to mark for cutouts with the unsecured panel abutting the secured panel, yet positioned at an inclined angle with respect to the secured panel, which introduces error into markings, particularly markings remote from the secured panel. The marking clips themselves readily accommodate thin walled components such as electrical outlet boxes. Further, however, the break away leg and adhesive permit use of the marking clips on window and door frames, and other components having walls too thick for conventional marking devices. In combination, the marker clips and stabilizers provide a system for efficient and accurate blind marking for cutouts through construction material panels.

What is claimed is:

1. An apparatus for aligning a panel of construction material in a parallel and offset relation to a previously installed panel of the construction material, said apparatus including:

a unitary and substantially rigid alignment member including a medial segment; a first edge alignment segment extending away from the medial segment and having a planar first edge alignment surface disposed in an alignment plane; a second edge alignment segment extended from the medial segment on a side of the medial segment opposite to that of the first edge alignment segment, with the second edge alignment segment including a second planar edge alignment surface in said alignment plane and spaced apart from the first alignment surface a selected distance determined by a thickness of the medial segment, and wherein the first and second alignment surfaces face in opposite directions;

wherein said first edge alignment surface is adapted for contiguous surface engagement with a first end edge surface of an installed panel of construction material and the second edge alignment surface is adapted for contiguous surface engagement with a second end edge surface of an unsecured panel of construction material, with the installed and unsecured panels contiguous with the medial segment, thereby positioning the unsecured panel parallel to the installed panel, spaced apart from the installed panel by said selected distance, and with the first and second end edge surfaces substantially aligned with one another in said alignment plane.

2. The apparatus of claim 1 wherein:

the alignment member further includes a first end segment extended away from a portion of the first edge alignment segment remote from the medial segment and in a first direction substantially normal to the alignment plane, with the first end segment, first edge alignment segment and medial segment cooperating to define a groove for receiving a portion of the installed sheet panel including said first edge surface.

3. The apparatus of claim 2 wherein:

the first end segment is tapered to converge in the direction of extension away from the first edge alignment segment.

4. The apparatus of claim 2 wherein:

the first end segment and the medial segment are spaced apart from one another a distance approximately equal to a thickness of the installed panel.

5. The apparatus of claim 2 wherein:

the alignment member further includes a second end segment extended away from a portion of the second edge alignment segment remote from the medial segment, and in a second direction substantially normal to the alignment plane.

6. The apparatus of claim 5 wherein:

each of the first and second end segments is tapered to converge as it extends away from its associated one of the edge alignment segments.

7. The apparatus of claim 6 wherein:

each of the first and second end segments is spaced apart from the medial segment a selected distance approximately equal to a thickness dimension of the installed and non-secured panels.

8. An apparatus for indicating the location of material to be removed from an unsecured panel of construction material prior to installation of the panel to provide clearance for previously installed construction components, the apparatus including:

a carrier body;

a pair of alignment projections extending from one edge of the carrier body in a direction perpendicular to a major plane of the carrier body, and disposed to engage an outer end edge of an installed construction component with the carrier body contiguous with a component surface of the construction component; and at least one marking projection extending from said one edge of the body in the direction of the major plane, and extending outwardly of the construction component when the body is contiguous with said component surface and the alignment projections abut said component edge, whereby the marking projection is positioned to engage a surface of a panel of unsecured construction material moved inwardly toward the construction component, and further to form a position mark upon the panel as the panel is moved further inward beyond said engagement.

9. The apparatus of claim 8 further including:
a means for securing the carrier body in its contiguous relation with the component surface.

10. The apparatus of claim 9 wherein:
said securing means comprises a flexible leg supported at one end by the carrier body, spaced apart from the body and cooperating with the body to elastically secure a portion of the construction component between the body and the leg.

11. The apparatus of claim 10 wherein:
the leg is substantially narrower than the carrier body, and is substantially centered between said pair of alignment projections, and wherein the alignment projections are disposed at opposite side edges of the carrier body.

12. The apparatus of claim 11 including:
two of said marking projections, one disposed near each of said alignment projections.

13. The apparatus of claim 9 wherein:
said securing means includes an adhesive.

14. The apparatus of claim 10 further including:
a relief groove running along an interface between the leg and the body, to facilitate flexure of the leg, and further to facilitate a breaking of the leg away from the body upon sufficient flexure of the leg.

15. The apparatus of claim 10 further including:
a camming dimple on a side of the leg confronting the carrier body.

16. The apparatus of claim 15 further comprising:
respective first and second angularly offset feet formed along the body and the leg, respectively, said feet cooperating to form a lead-in groove.

17. The apparatus of claim 8 wherein:
at least two of said marking projections extend from the edge of the body in spaced apart relation to one another, and are configured with pointed edges remote from the body, whereby the marking projections puncture the construction material panel surface as the panel is pressed inwardly against the construction component.

18. A system for aligning a panel of construction material in a parallel and offset relation to a previously installed panel of the construction material for marking the location of an opening to be formed through the panel to be installed, including:

at least one unitary and substantially rigid alignment member, each alignment member including a medial segment, a first edge alignment segment extending away from the medial segment and having a planar first edge alignment surface disposed in an alignment plane, a second edge alignment segment extended from the medial segment on a side of the medial segment opposite to that of the first edge alignment segment and with the second edge alignment segment including a second planar edge alignment surface in said alignment plane and spaced apart from the first edge alignment surface a selected distance determined by a thickness of the medial segment, and wherein the first and second alignment surfaces face in opposite directions; wherein said at least one rigid alignment member is supported along a first end edge surface of an installed panel of construction material with said first edge alignment surface contiguous with said first end edge surface, whereby the second edge alignment surface is disposed for aligning an unsecured panel of the construction material in a predetermined cutout marking position wherein the unsecured panel is parallel to the installed panel, spaced apart from the installed panel by said selected distance, and wherein the first end edge surface and a second end edge surface of a non-secured panel are substantially aligned with one another in the alignment plane; and a marker means mounted to a construction component fixed spaced apart from the installed panel and within an area to be covered by the unsecured panel, said marking means projecting outwardly of the component to encounter a surface of the unsecured panel as the unsecured panel is placed in said marking position, whereby the marking means engages said surface to form at least one position mark upon the unsecured panel as the unsecured panel is moved inwardly from said marking position.

19. The system of claim 18 including:
a plurality of said rigid alignment members disposed along the first end edge of the installed panel; and
wherein the marking means includes a plurality of clips fastened to the construction component, each clip including a carrier body, a pair of alignment projections extending from one edge of the carrier body and engaged against an outer end edge of the construction component with the carrier body contiguous with a component surface of the construction component, and at least one marking projection extending outwardly from said one edge of the carrier body in the direction of the major plane.

20. The system of claim 19 wherein:
each of the clips includes at least two of the marking projections, one marking projection extended from each side of the clip, said marking projections having pointed edges remote from the carrier body whereby the marking projections puncture said surface of the unsecured panel as the panel is moved inwardly from the marking position.

* * * * *